United States Patent [19]
Held

[11] 3,841,034
[45] Oct. 15, 1974

[54] TREAD GRINDING WHEEL

[76] Inventor: Gerhard R. Held, 22644 Shiell Dr., Mt. Clemens, Mich. 48043

[22] Filed: Nov. 10, 1972

[21] Appl. No.: 305,479

[52] U.S. Cl................. 51/356, 51/204, 51/DIG. 33
[51] Int. Cl......... B24d 5/10, B24b 5/04, B24b 5/44
[58] Field of Search.......... 51/356, 206 P, 395, 396, 51/397, 266, 267, 204, 106 R, DIG. 33

[56] References Cited
UNITED STATES PATENTS

| | | | |
|---|---|---|---|
| 278,608 | 5/1883 | Schreibler | 51/206 P |
| 1,736,355 | 11/1929 | Mosher | 51/206 P |
| 2,804,733 | 9/1957 | Hurst | 51/397 |
| 2,837,878 | 6/1958 | Johnson | 51/266 |
| 3,145,511 | 8/1964 | Bird | 51/266 |
| 3,259,959 | 7/1966 | Tobey | 51/206 R |
| 3,495,359 | 2/1970 | Smith | 51/267 |
| 3,681,877 | 2/1974 | Shively | 51/106 R |

FOREIGN PATENTS OR APPLICATIONS

| 523,879 | 7/1940 | Great Britain | 51/206 P |
|---|---|---|---|

Primary Examiner—Al Lawrence Smith
Assistant Examiner—Robert C. Watson
Attorney, Agent, or Firm—Cullen, Settle, Sloman & Cantor

[57] ABSTRACT

A self-cooling tread grinding wheel having a longitudinally flat or concave carbide coated body with a series of longitudinally spaced circular rows of radial air cooling slots, wherein, the slots extend part way through the body or all the way through the body.

A modified grinding wheel of either type of slot, wherein, the slots are parallel, staggered or intersecting and parallel to or inclined to the body axis. A further modification of either type, wherein, the slots are longitudinally overlapped at their inner ends and may be of uniform depth or of decreasing depth at the slot ends.

2 Claims, 13 Drawing Figures

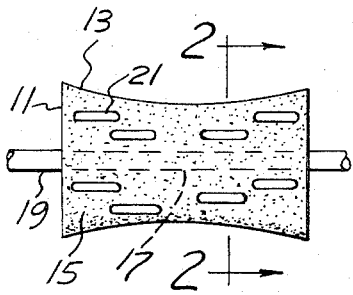
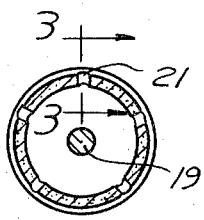
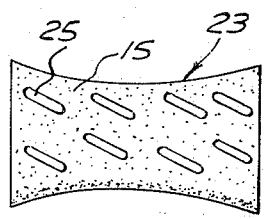
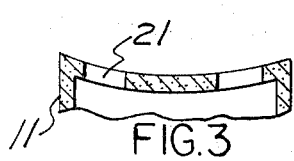
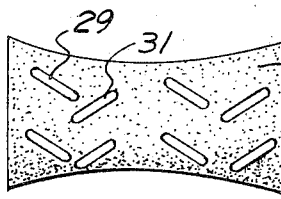
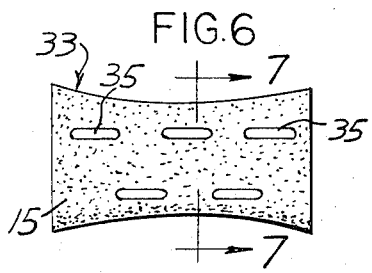
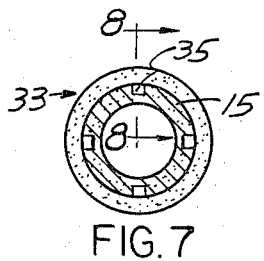
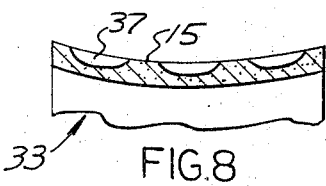
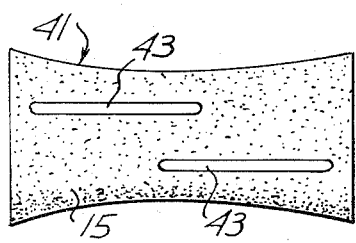
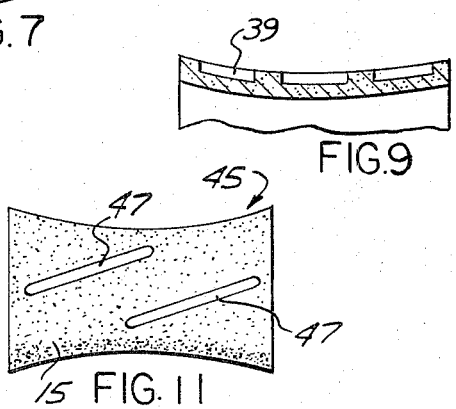
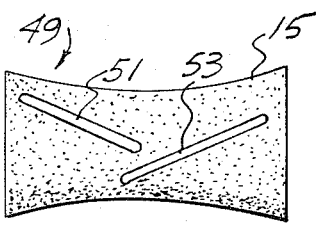
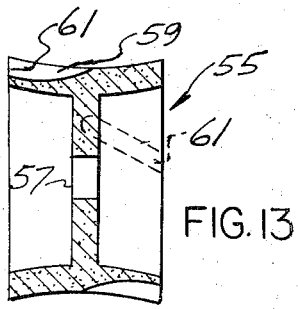

3,841,034

TREAD GRINDING WHEEL

BACKGROUND OF THE DISCLOSURE

Heretofore, in the finishing of molded or otherwise formed vehicle tires of rubber or equivalent resilient material, it has been necessary to apply a power operated longitudinally flat or concave abrasive grinding wheel to the exterior periphery thereof to assure uniformity of the exterior surface. During such grinding, there has been excessive heating of the grinding wheel and the tire tread due to friction and, wherein, it has been found extremely difficult to provide adequate cooling of the grinding wheel and tire and to maintain reasonable temperatures to avoid fire and other hazards including damage to the tire and grinding wheel.

Various efforts have been made to cool the wheel by the application of external cooling air or by the application of fins or attachments to the grinding wheel for the purpose of directing air currents over the exterior surface thereof.

BRIEF DESCRIPTION OF THE INVENTION

It is an object of the present invention to provide a monolith grinding wheel which consists of an elongated metal or steel body which is longitudinally, flat or concave and which has a carbide surface throughout and, wherein, they are applied to the surface a series of longitudinally spaced circular rows of spaced radial slots formed in said surface to provide an automatic cooling action during rotation of the grinding wheel.

It is another object to control the depth and the shape of such slots and their direction to provide for improved and increased automatic cooling.

It is a further object to arrange the slots in each row parallel to each other and, wherein, the slots between adjacent rows are staggered and may be parallel to or inclined to the body axis and, furthermore, may be longitudinally intersecting at their inner ends and may or may not be overlapped.

It is a further object to provide slot construction, wherein, the slots may be of uniform depth throughout their length or alternately, at their outer ends may be tapered of gradually decreasing depth moving out into the body surface.

These and other objects will be seen from the following specification and claims in conjunction with the appended drawing.

THE DRAWING

FIG. 1 is a front elevational view of the present self-cooling longitudinally concave carbide coated grinding wheel with air cooling slots therein;

FIG. 2 is a section taken in the direction of arrows 2—2 of FIG. 1;

FIG. 3 is a fragmentary section taken in the direction of arrows 3—3 of FIG. 2;

FIG. 4 shows a modified grinding wheel with the slots inclined to the longitudinal axis;

FIG. 5 is a side elevational view with the slots extending at an angle to each other;

FIG. 6 is a side elevational view of a modified self-cooling grinding wheel with the slots extending only part way into the wheel body;

FIG. 7 is a section taken in the direction of arrows 7—7 of FIG. 6;

FIG. 8 is a longitudinal section taken in the direction of arrows 8—8 of FIG. 7;

FIG. 9 is a view similar to FIG. 8 showing the slots of uniform depth;

FIG. 10 is a side elevational view of a modified grinding wheel with the slots of adjacent rows longitudinally overlapped at their inner ends and parallel to the body axis;

FIG. 11 is a side elevational view of a modified grinding wheel with the slots in adjacent rows parallel and longitudinally overlapped at their inner ends;

FIG. 12 is a side elevational view of a modified grinding wheel with the respective slots of adjacent rows longitudinally overlapped and extending at an angle towards each other;

FIG. 13 is a vertical section of a modified grinding wheel, with the slots of opposed rows of maximum depth and running out at the respective ends of the grinding wheel and at their inner ends are of gradually decreasing depth.

DETAILED DESCRIPTION OF THE INVENTION

Referring to the drawing, the basic self-cooling tread grinding wheel of the present invention includes a body 11 preferably metal and preferably steel which is longitudinally, flat or concave at 13 and has upon its exterior surface a suitable uniformly dispersed abrasive carbide coating 15.

The body includes intermediate its ends a transverse web terminating in a central hub 17 adapted to axially receive the elongated power driven support shaft 19, fragmentarily shown.

This description is applicable to the modifications shown in FIGS. 4, 5, 6, 10, 11, 12 and 13.

In the grinding wheel shown in FIGS. 1, 2 and 3, there are provided upon said body a series of longitudinally spaced circular rows of spaced elongated radially directed air-cooling slots 21.

As illustrated in FIG. 2, the slots 21 extend all the way through the body. The slots in each row of slots are parallel to each other, and in this embodiment, the slots between adjacent rows are staggered and all extend in a direction parallel to the body axis X shown in FIG. 1 and may or may not overlap at their ends.

The respective slots 21 in the individual rows are elongated and are of uniform depth extending through the body wall as best shown in FIG. 3. Accordingly, on power rotation of the body 11, the arrangement of the slots is such that sufficient cooling air is drawn through said slots so as to move laterally outward and over the body surface for automatic cooling thereof.

In the modification 23, FIG. 4, the slots 25 of the individual rows of slots are parallel, and extend at an acute angle to the body axis.

In the modification 27, FIG. 5, the individually parallel slots 29 of each circular row of slots are inclined at an angle with respect to the adjacent row of slots 31 and may overlap at their one ends.

While the structures shown in the modifications, FIGS. 1, 4 and 5, provide substantial cooling of the grinding wheel for the purpose of grinding tire tread or for other grinding purposes, it has been found that the modified grinding wheel 33 of FIG. 6 is an improvement. Here the slots 35 arranged in circular rows and spaced to extend radially outward are effective in cooling and extend only part way into the body, FIG. 7, and not all the way through as shown in FIG. 2.

In the construction shown in FIGS. 6, 7 and 8, the slots 35 of the individual rows of slots are shown parallel to the longitudinal axis. It is contemplated that the slots 35 could be arranged as are the slots 25 of FIG. 4 inclined to the body axis or the slots of adjacent rows may extend in an intersecting manner as shown at 29-31, FIG. 5.

As shown in FIG. 8, the slots corresponding to the slots 35 are of maximum depth intermediate their ends but at the ends 37 are of gradually decreasing depth and tapered running out into the body surface as shown.

Corresponding slots 39 in FIG. 9 are shown as being of uniform depth throughout its length.

In the modified grinding wheel 41 of FIG. 10, the respective slots 43 of the adjacent rows of slots formed in said body preferably extend only part way into the body as shown at FIG. 7 and at their inner ends, are longitudinally overlapped and are parallel as shown.

The modification 45 of FIG. 11 shows the slots 47 of adjacent rows of slots parallel yet inclined to the longitudinal axis. Here also, the slots 47 extend only part way into the body as shown in FIG. 7.

In the modified grinding wheel 49 in FIG. 12, the adjacent slots 51 and 53 of adjacent rows of slots are longitudinally overlapped at their inner ends and at the same time extend at an acute angle with respect to each other. Here also the slots preferably only extend part way into the body.

It is contemplated in the modifications shown in FIGS. 10, 11 and 12, that the slots could go all the way through the body if desired for increased cooling, which in many cases, is not needed.

A further modified grinding wheel 55 is shown in FIG. 13, wherein the respective rows of slots 59 are of maximum height at their outer ends where they run out into the end portions of the body opening as shown at 61 into end portions thereof. The slots at their inner ends are of gradually decreasing depth running out into the outer body surface as shown.

From the foregoing disclosure, while the basic grinding wheel includes a longitudinally, flat or concave wheel body with an abrasive exterior surface and with cooling slots formed therein for automatic air cooling, it is seen that these slots may go all the way through the body, FIGS. 1 through 5, or may go partly into the body as shown in FIGS. 6 through 13.

It has been shown that variations of the arrangement of the slots are possible, such as the slots all being parallel to the body axis or being inclined at an acute angle to the body axis.

Furthermore, the slots of adjacent rows are normally staggered with respect to each other for improved cooling and in some instances, the slots of one circle of slots extend at an acute angle or an obtuse angle with respect to the slots of an adjacent circle of slots.

In some instances, the slots at their inner ends longitudinally overlap whether they are parallel to the body axis or inclined thereto and may or may not be intersecting with respect to each other between adjacent rows of slots.

The final modification 55 of FIG. 13 shows rows of slots which open to end portions of the body as at 61 to distinguish from the other variations shown in the drawing, and are of maximum depth at the run out portion. These are of decreasing depth towards their inner ends, running out and merging with the body surface.

The present invention is not directed to the particular method of applying the carbide coating which is suitably abrasive for the intended purpose, but is directed to a carbide coated grinding wheel, particularly adapted for the grinding of tire treads wherein the slots may go all the way through the body or partly thereinto.

The presence of the slots provides for an automatic self-air-cooling of the wheel as it is power rotated with respect to the work being ground, as for example, the tread of tires, though not limited thereto.

It is contemplated, furthermore, that the degree of cooling desired or to be obtained may be varied depending upon the size and arrangement of the slots and the number of rows thereof formed into or through the grinding wheel body.

Having described my invention, reference should now be had to the following claims.

I claim:

1. A self-cooling tread grinding wheel comprising an axially elongated annular body having an abrasive exterior surface;
    said body being unitary and having a concave exterior surface configuration in the direction of its longitudinal axis;
    a radially transverse internal web and a hub parallel to the longitudinal axis of said body, for mounting upon a drive shaft;
    said body having a series of longitudinal spaced circumferential rows of elongated non-circular air cooling slots;
    said elongated slots extending radially inward from the exterior surface of the body to a depth not more than one half the body thickness;
    said elongated slots being spaced axially inward of the longitudinal ends of said body;
    the slots in each row being parallel;
    said slots being of maximum depth intermediate their ends, with end portions of the slots running out to the outer surface of the body;
    said slots extending at an acute angle to the body axis.

2. In the grinding wheel of claim 1, the slots in one row being staggered with respect to the slots of an adjacent row; the slots in one row at their inner ends longitudinally overlapping the slots of an adjacent row; the slots of one row extending at an abtuse angle with respect to the slots of an adjacent row.

* * * * *